United States Patent
Cho et al.

(10) Patent No.: US 8,990,941 B2
(45) Date of Patent: Mar. 24, 2015

(54) APPARATUS FOR DETECTING AND CONTROLLING INFECTED MOBILE TERMINAL

(71) Applicant: Wins Technet Co., Ltd, Seongnam-si (KR)

(72) Inventors: HarkSu Cho, Seongnam-si (KR); Cheal Jeong Park, Anyang-si (KR); Young Kook Noh, Seoul (KR)

(73) Assignee: Pangyo Seven Venture Valley, Seongnam-si (KR)

( * ) Notice: Subject to any disclaimer, the term of this patent is extended or adjusted under 35 U.S.C. 154(b) by 137 days.

(21) Appl. No.: 13/889,177

(22) Filed: May 7, 2013

(65) Prior Publication Data

US 2013/0318608 A1    Nov. 28, 2013

(30) Foreign Application Priority Data

May 9, 2012    (KR) .................... 10-2012-0049205

(51) Int. Cl.
| | |
|---|---|
| H04W 12/08 | (2009.01) |
| H04W 88/16 | (2009.01) |
| H04W 88/18 | (2009.01) |
| G06F 21/55 | (2013.01) |
| G06F 21/56 | (2013.01) |
| H04L 29/06 | (2006.01) |

(52) U.S. Cl.
CPC .......... *H04L 63/1416* (2013.01); *H04W 12/08* (2013.01); *H04L 63/1408* (2013.01)
USPC .............. 726/23; 726/22; 726/24; 726/25; 709/223; 709/224; 709/225; 709/226

(58) Field of Classification Search
CPC ..... H04W 12/08; H04W 88/16; H04W 88/18; H04L 63/20; H04L 63/1408; H04L 63/1425; H04L 63/1441; H04L 67/322; G06F 21/55; G06F 21/56
USPC ............................ 726/22–26; 709/223–226
See application file for complete search history.

(56) References Cited

U.S. PATENT DOCUMENTS

| | | | | |
|---|---|---|---|---|
| 2006/0120284 | A1* | 6/2006 | Kim et al. | 370/230 |
| 2006/0272025 | A1* | 11/2006 | Mononen | 726/26 |
| 2006/0291448 | A1* | 12/2006 | Hellgren et al. | 370/352 |
| 2011/0314542 | A1* | 12/2011 | Viswanathan et al. | 726/23 |

* cited by examiner

*Primary Examiner* — Joseph P Hirl
*Assistant Examiner* — Kalish Bell
(74) *Attorney, Agent, or Firm* — Joseph H. Kim; JHK Law

(57) ABSTRACT

In a technique of isolating an infected mobile terminal, the disclosed embodiment relates to an apparatus for detecting and controlling an infected mobile terminal, in which the infected mobile terminal is detected from a communication network associated with a mobile communication network.

15 Claims, 4 Drawing Sheets

APPARATUS FOR DETECTING AND CONTROLLING INFECTED MOBILE TERMINAL

BACKGROUND OF THE INVENTION

1. Field of the Invention

The disclosed embodiment relates to a technique of isolating an infected mobile terminal, and more specifically, to an apparatus for detecting and controlling an infected mobile terminal, in which the infected mobile terminal is detected from a communication network associated with a mobile communication network, and the infected mobile terminal is isolated from the mobile communication network according to a result of the detection.

2. Background of the Related Art

After commercialization of mobile terminals, users of the mobile terminals are spread across all age groups, and techniques related to the mobile terminals are developed unceasingly.

Furthermore, with the structural and functional advancement in the mobile terminals, data and applications stored therein also tend to be large-scaled and diversified.

Recently, mobile banking services or mobile stock trading services are provided based on information security.

Compared to the advancement in the mobile terminal techniques and the services based thereon, understanding or knowledge of mobile terminal users on security is still insufficient, and security systems for mobile terminals provided by operating companies do not get out of a standstill state.

Particularly, since recently released mobile terminals are in pursuit of diverse service functions and large capacity, information which specially requires security such as personal information or banking information is stored in the mobile terminals. However, since security techniques for protecting the information are only at an entry level, severe damages may occur when the information is leaked.

In addition, transmission of abnormal information which randomly distributes a large quantity of data containing contents that a user does not want is spread, and spread of the abnormal information increases worries about infection of the mobile terminals.

Meanwhile, although the problems are solved to some extent by developing dedicated vaccine software for the security of mobile terminals and installing the vaccine software in the mobile terminals, since techniques of hackers for avoiding the vaccine software are advanced day by day, stable security may not be realized with only the dedicated vaccine software of the mobile terminals.

As a result, it is desirable to prepare another potent countermeasure, and one of the most effective ideas is that a mobile communication control apparatus detects and blocks information leakage or abnormal access within a communication service network itself.

However, the mobile communication control apparatus only encrypts and decrypts data in a process of transmitting the data between a mobile terminal and a packet switch such as a gateway GPRS Support Node (GGSN). However, since this is a method of transmitting data without validating the data or considering contents of the data or network resources, security of the data transmitted to the mobile communication network or stability of the mobile communication service may not be secured although transmission efficiency may be enhanced.

SUMMARY OF THE INVENTION

Therefore, the disclosed embodiment has been made in view of the above problems, and it is an object of the disclosed embodiment to provide an apparatus for detecting and controlling an infected mobile terminal, in which the infected mobile terminal is detected considering validity of packets, which are transmitted in a packet exchange section between a mobile communication network and another communication network, and communication network resources, and the infected mobile terminal is isolated from the mobile communication network by providing a result of the detection to the mobile communication network.

To accomplish the above object, according to one aspect of the disclosed embodiment, there is provided an apparatus for detecting and controlling an infected mobile terminal, the apparatus including: a packet processing unit for separating packets of an upload traffic or a download traffic into an authentication packet and a transmission packet in a packet exchange section between a mobile communication network which provides a communication service to a mobile terminal and another communication network which provides a communication service to a service server; and a terminal control unit for updating a terminal identification number of the mobile terminal with a latest value using the authentication packet and, when the transmission packet is an abnormal transmission packet, requesting release of a radio resource allocated to the mobile terminal by transmitting a terminal identification number corresponding to the latest value to the mobile communication network.

The packet processing unit may included a packet output module for transmitting a corresponding normal transmission packet to the another communication network when the transmission packet of the upload traffic is a normal transmission packet, transmitting a corresponding normal transmission packet to the mobile communication network when the transmission packet of the download traffic is a normal transmission packet, and blocking transmission of a corresponding abnormal transmission packet when the transmission packet of the upload or download traffic is an abnormal transmission packet.

The packet processing unit may include: a blacklist module having a blocking list in which a plurality of pieces of identification information corresponding to tuple information is registered as blocking targets; and a resource management module having a resource management table for registering information on a first communication resource for the mobile terminal, an amount of the first communication resource currently allocated to the mobile terminal and a threshold value of the first communication resource set for the mobile terminal in correspondence to tuple information of the mobile terminal, and registering information on a second communication resource for the service server, an amount of the second communication resource currently allocated to the service server and a threshold value of the second communication resource set for the service server in correspondence to tuple information of the service server. Here, the tuple information may include a protocol, a protocol identification number, a source IP address, a destination IP address, a source port number and a destination port number.

As an IP address contained in the transmission packet is searched for from the blocking list, the blacklist module may classify the transmission packet as the abnormal transmission packet.

The blacklist module may perform a deep packet inspection (DPI) process based on information on contents of the transmission packets transmitted in the packet exchange section and registers identification information of the blocking target in the blocking list based on a result of the deep packet inspection process.

The resource management module may delete information on a communication resource allocated for the abnormal transmission packet, among the first communication resource and the second communication resource, from the resource management table using an IP address contained in the abnormal transmission packet.

The apparatus for detecting and controlling an infected mobile terminal may further include a communication resource management unit for examining a request for allocation of a new communication resource based on the resource management table. Here, when a request for allocating the new communication resource exceeds the threshold value of the first communication resource, the communication resource management unit may transfer identification information of the mobile terminal to the terminal control unit and, at a same time, register the identification information of the mobile terminal in the blocking list as a blocking target. In addition, when a request for allocating the new communication resource exceeds the threshold value of the second communication resource, the resource management unit may register identification information of the service server in the blocking list as a blocking target.

The amount of the first communication resource may be a number of sessions currently allocated to the mobile terminal, the threshold value of the first communication resource may be a maximum number of sessions that can be allocated to the mobile terminal, the amount of the second communication resource may be a number of sessions currently allocated to the service server, and the threshold value of the second communication resource may be a maximum number of sessions that can be allocated to the service server. In addition, the amount of the first communication resource may be an amount of band resources that can be allocated to the mobile terminal, the threshold value of the first communication resource may be a maximum amount of band resources that can be allocated to the mobile terminal, the amount of the second communication resource may be an amount of band resources that can be allocated to the service server, and the threshold value of the second communication resource may be a maximum amount of band resources that can be allocated to the service server.

The packet processing unit may transfer an IP address contained in the abnormal transmission packet to the terminal control unit.

The terminal control unit may include a mobile terminal mapping table in which the terminal identification number corresponding to identification information of the mobile terminal is registered and update the terminal identification number registered in the mobile terminal mapping table with the latest value using the authentication packet.

The terminal control unit may transmit the latest value to an equipment identity register (EIR) which controls allocation or release of the radio resource for the mobile terminal.

The user identification number may be an International Mobile Station Identity (IMSI).

DETAILED DESCRIPTION OF THE PREFERRED EMBODIMENT

The other objects, features and advantages of the disclosed embodiment will be clarified through the detailed description of the embodiments with reference to the accompanying drawings.

Hereinafter, the configuration and actions of the preferred embodiments of the disclosed embodiment will be described in detail with reference to the accompanying drawings. The configuration and actions of the disclosed embodiment shown in the figures and explained thereby are described at least as an embodiment, and technical spirits of the disclosed embodiment and the core configuration and actions thereof will not be restricted by the embodiment.

Hereinafter, the preferred embodiments of an apparatus for detecting and controlling an infected mobile terminal according to the disclosed embodiment will be described in detail with reference to the accompanying drawings, and since a mobile terminal is defined as an infected mobile terminal in the following description, the mobile terminal and the infected mobile terminal will be described using the same symbol.

Figure 1:
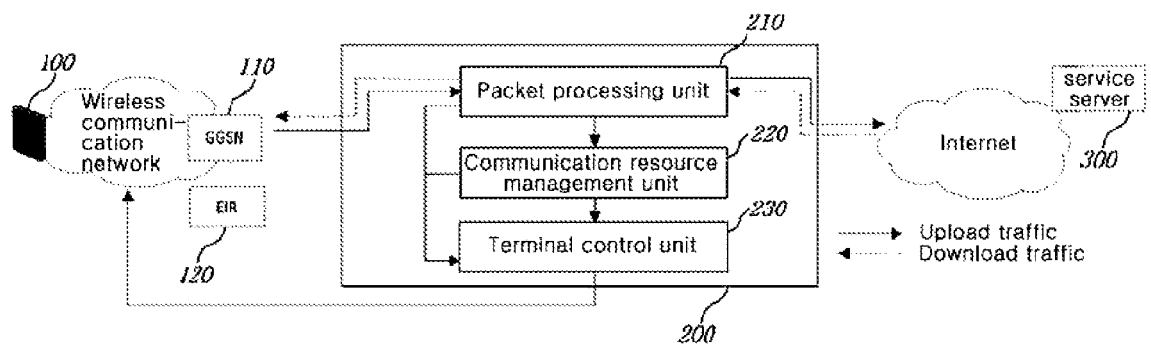
FIG. 1 is a view showing the configuration of an apparatus for detecting and controlling an infected mobile terminal, a mobile communication network for providing a service to the mobile terminal and the Internet associated with the mobile communication network according to an embodiment of to the disclosed embodiment.

FIG. 1 is a view showing the configuration of an apparatus for detecting and controlling an infected mobile terminal, a mobile communication network for providing a service to the mobile terminal and the Internet associated with the mobile communication network according to an embodiment of to the disclosed embodiment.

Referring to FIG. 1, the apparatus of the disclosed embodiment largely includes a packet processing unit 210, a communication resource management unit 220 and a terminal control unit 230.

The apparatus for detecting and controlling an infected mobile terminal according to the disclosed embodiment is provided in a packet exchange section between a mobile communication network which provides a communication service to the mobile terminal 100 and another communication network associated with the mobile communication network. Here, the mobile communication network may be either a synchronous mobile communication network or an asynchronous mobile communication network. For example, the mobile communication network may be any one of CDMA2000 1x (Code Division Multiple Access 2000 1x), CDMA2000 1xEVDO (Code Division Multiple Access 2000 1x Evolution Data Only), GPRS (General Packet Radio Services), UMTS (Universal Mobile Telecommunications System), UTRAN (Universal Terrestrial Radio Access Network), EDGE (Enhanced Data for GSM Evolution), WiFi, WiMax, WiBro, 3rd Generation network, 4th Generation network and a next-generation mobile communication network, and although the GPRS is described as an example in the disclosed embodiment, it is not limited thereto. In addition, the another communication network associated with the mobile communication network is preferably a wired communication network, and the wired communication network may be any one of a Local Area Network (LAN), a Wide Area Network (WAN), a Digital Subscriber Loop (DSL) network and a cable network. Although the Internet which provides the service server 300 with a communication service is described as an example in the disclosed embodiment, it is not limited thereto.

Figure 4:
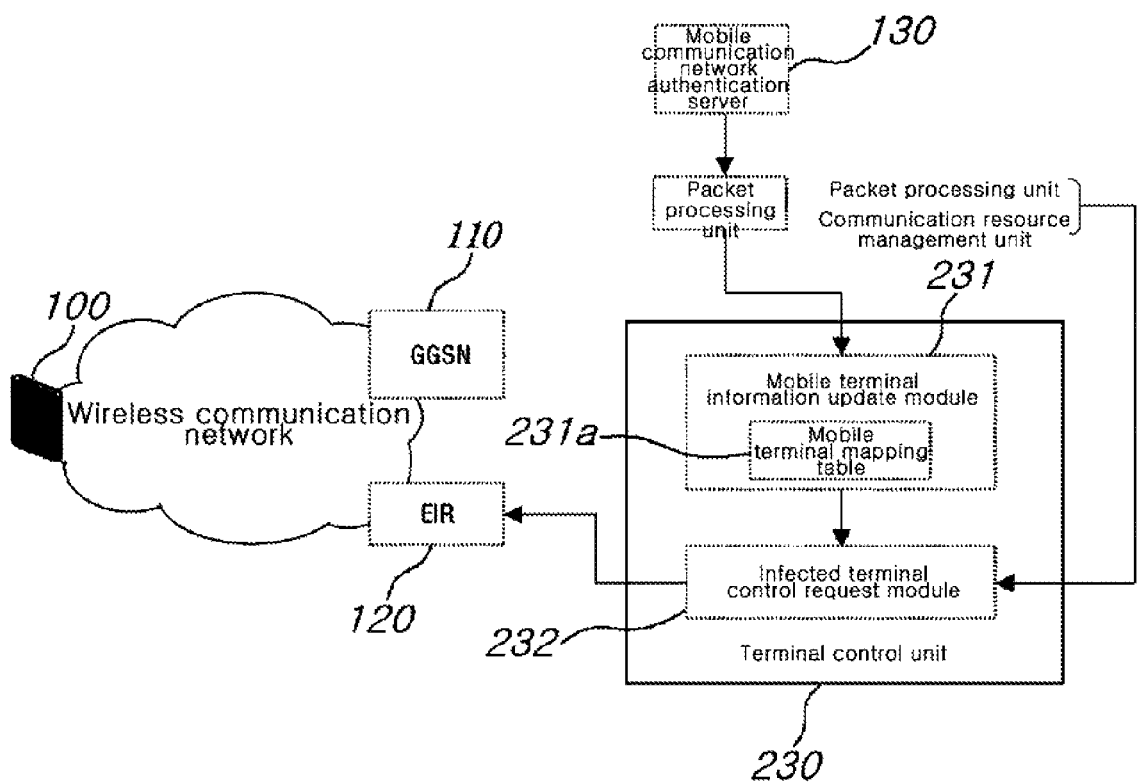
FIG. 4 is a block diagram showing the configuration of a terminal control unit of an apparatus for detecting and controlling an infected mobile terminal according to an embodiment of the disclosed embodiment.

The mobile communication network is provided with a GGSN 110 as a packet exchange and an equipment identity register (EIR) 120 which is a control device for allocating and releasing radio resources of the mobile terminal 100 in the mobile communication network. In addition, a mobile communication network authentication server 130 may be provided as shown in FIG. 4.

The Internet as another communication network associated with the mobile communication network may be provided with a service server 300 for providing a variety of wired network services.

The apparatus according to the disclosed embodiment examines whether or not the mobile terminal 100 is infected in the packet exchange section between the mobile communication network and the Internet and provides information according to a result of the examination. Accordingly, a corresponding infected mobile terminal 100 is isolated using identification information of the mobile terminal 100 provided from the mobile communication network.

The apparatus according to the disclosed embodiment blocks transmission of packets of an upload or download traffic based on infection of a transmission packet and, in addition, supports a communication resource management process for prohibiting a new communication resource based on communication resources of the service server or the mobile terminal.

The apparatus of the disclosed embodiment largely includes the packet processing unit 210, the communication resource management unit 220 and the terminal control unit 230.

Figure 2:
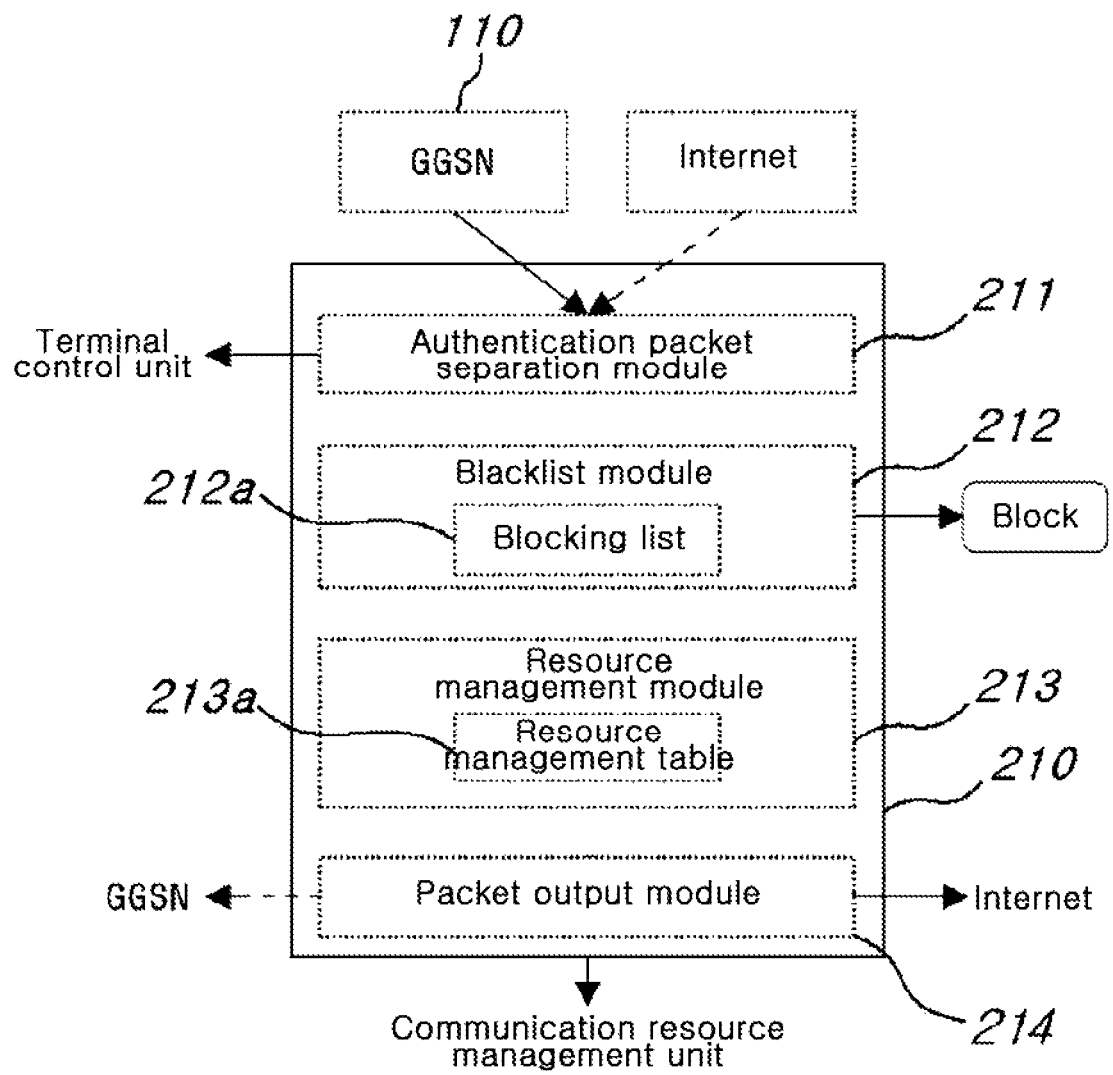
FIG. 2 is a block diagram showing the configuration of a packet processing unit of an apparatus for detecting and controlling an infected mobile terminal according to an embodiment of the disclosed embodiment.
Figure 3:
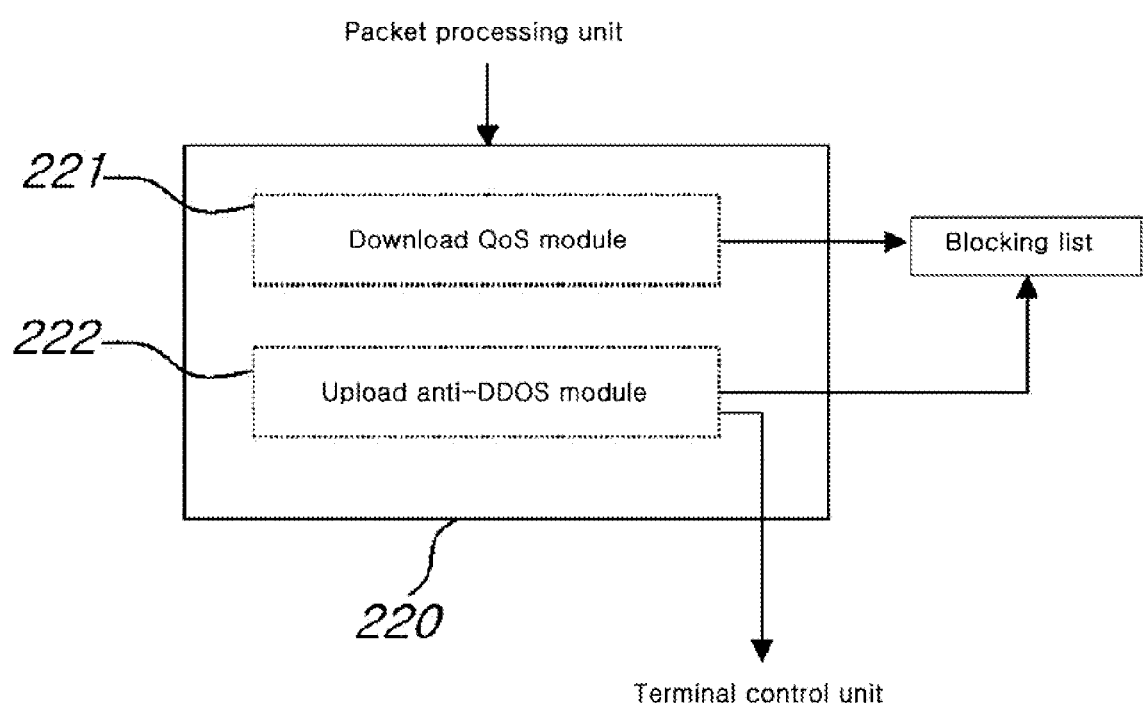
FIG. 3 is a block diagram showing the configuration of a communication resource management unit of an apparatus for detecting and controlling an infected mobile terminal according to an embodiment of the disclosed embodiment.

FIG. 2 is a block diagram showing the configuration of a packet processing unit of an apparatus for detecting and controlling an infected mobile terminal according to an embodiment of the disclosed embodiment, FIG. 3 is a block diagram showing the configuration of a communication resource management unit of an apparatus for detecting and controlling an infected mobile terminal according to an embodiment of the disclosed embodiment, and FIG. 4 is a block diagram showing the configuration of a terminal control unit of an apparatus for detecting and controlling an infected mobile terminal according to an embodiment of the disclosed embodiment.

Referring to FIG. 2, the packet processing unit 210 includes an authenticated packet separation module 211, a blacklist module 212, a resource management module 213 and a packet output module 214. The blacklist module 212 includes a blocking list 212a, and the resource management module 213 includes a resource management table 213a.

The authenticated packet separation module 211 of the packet processing unit 210 separates packets of a traffic (an upload traffic or a download traffic) transmitted in the packet exchange section between the mobile communication network and the Internet into an authentication packet and a transmission packet. Here, the authentication packet is defined as a packet containing authentication information of the mobile terminal, and the transmission packet is defined as a packet containing user information other than the authentication information.

When a packet of the upload traffic is the authentication packet containing the authentication information, the authenticated packet separation module 211 provides the authentication packet to a mobile terminal information update module 231 provided in the terminal control unit 230. Here, the authentication packet may be provided by the mobile communication network authentication server 130, and the authenticated packet separation module 211 may provide the authentication information extracted from the authentication packet and identification information thereof to the mobile terminal information update module 231 provided in the terminal control unit 230.

In addition, when a packet of the upload or download traffic is the transmission packet, the authenticated packet separation module 211 extracts identification information needed for a validity test from the transmission packet.

The blacklist module 212 examines validity of the transmission packet using the identification information of the transmission packet, i.e., an IP address, extracted by the authenticated packet separation module 211, and the validity test is performed by comparing identification information of a blocking target registered in the blocking list 212a provided in the blacklist module 212 with the identification information of the transmission packet extracted at this time. Particularly, it is determines whether or not the identification information of the transmission packet (e.g., an IP address) is registered in the blocking list 212a, and the transmission packet is classified as a normal transmission packet or an abnormal transmission packet.

For example, if an IP address contained in a transmission packet is searched for from the blocking list 212a, the blacklist module 212 classifies the corresponding transmission packet as an abnormal transmission packet.

The blocking list 212a contains identification information of blocking targets among the packets of a traffic (an upload traffic or a download traffic) transmitted in the packet exchange section between the mobile communication network and the Internet. For example, the blocking list 212a can be created by performing a Deep Packet Inspection (DPI) process based on information on the contents of transmission packets transmitted in the packet exchange section. For example, the DPI process is performed on the information on the contents of the transmission packets, and if a transmission packet is determined as an infected abnormal transmission packet based on a result of the DPI process, the source IP address and the destination IP address contained in the abnormal transmission packet are registered in the blocking list 212a as blocking targets. In other words, identification information corresponding to a plurality of source IP addresses and identification information corresponding to a plurality of destination IP addresses may be registered in the blocking list 212a as blocking targets.

Meanwhile, the blocking list 212a may be divided into a part having a permanent preservative characteristic and a part having a temporary preservative characteristic. That is, some of identification information is permanently preserved so that the services which use the corresponding identification information are permanently blocked, and the other identification information is preserved only for a predetermined period of time so that the services which use the corresponding identification information are allowed after the predetermined time period is elapsed.

A result of the validity test performed on the transmission packets by the resource management module 213 is provided to the resource management module 213, and, in addition, the identification information contained in the abnormal transmission packet is provided to the terminal control unit 230. For example, the blacklist module 212 transfers an IP address allocated to the mobile terminal 100, among the source IP address and the destination IP address contained in the abnormal transmission packet, to the terminal control unit 230.

Here, as the transmission packet is confirmed as an abnormal transmission packet in the result of the validity test performed on the transmission packet, the blacklist module 212 provides the terminal control unit 230 with the identification information of the mobile terminal 100 contained in the abnormal transmission packet. For example, when a transmission packet of an upload traffic is an abnormal transmission packet, the blacklist module 212 transfers the source IP address contained in the abnormal transmission packet to the terminal control unit 230, and when a transmission packet of a download traffic is an abnormal transmission packet, the blacklist module 212 transfers the destination IP address contained in the abnormal transmission packet to the terminal control unit 230.

The resource management module 213 creates a resource management table 213a for managing communication resources set for a traffic (an upload traffic or a download traffic) transmitted in the packet exchange section between the mobile communication network and the Internet. Here, the resource management table 213a provided in the resource management module 213 is for managing creation and deletion of communication resources such as a session resource or a band resource. For example, when a new session for packet transmission is established in the mobile communication network or the Internet, the resource management module 213 creates information on the new session in the resource management table 213a, and when a session is released as packet transmission is completed, the resource management module 213 deletes information on the session from the resource management table 213a.

In addition, the resource management module 213 manages the resource management table 213a using a result of the validity test of the blacklist module 212. That is, the resource management module 213 deletes information on the communication resource allocated for a transmission packet classified as an abnormal transmission packet by the blacklist module 212 from the resource management table 213a.

When the blacklist module 212 provides a validity test result confirming a transmission packet as an abnormal transmission packet, the resource management module 213 deletes information on the session resource registered for the abnormal transmission packet from the resource management table 213a.

The resource management module 213 may create or delete the information stored in the resource management table 213a. The resource management module 213 manages the resource management table 213a based on tuple information, and the tuple information may include a protocol, a protocol identification number (ID), a source IP address, a destination IP address, a source port number, a destination port number and the like.

Describing the interrelation between the blocking list 212a and the resource management table 213a, a plurality of pieces of identification information corresponding to the aforementioned tuple information is registered in the blocking list 212a as blocking targets. Information on a first communication resource for the mobile terminal 100, the amount of the first communication resource currently allocated to the mobile terminal 100 and a threshold value of the first communication resource set for the mobile terminal 100 are registered in the resource management table 213a in correspondence to the tuple information, and information on a second communication resource for the service server 300, the amount of the second communication resource currently allocated to the service server 300 and a threshold value of the second communication resource set for the service server 300 are registered in the resource management table 213a in correspondence to the tuple information. Here, the amount of the first communication resource is the number of sessions currently allocated to the mobile terminal 100, and the threshold value of the first communication resource is the maximum number of sessions that can be allocated to the mobile terminal 100. The amount of the second communication resource is the number of sessions currently allocated to the service server 300, and the threshold value of the second communication resource is the maximum number of sessions that can be allocated to the service server 300. Alternatively, the amount of the first communication resource is the amount of band resources currently allocated to the mobile terminal 100, and the threshold value of the first communication resource is the maximum amount of band resources that can be allocated to the mobile terminal 100. The amount of the second communication resource is the amount of band resources currently allocated to the service server 300, and the threshold value of the second communication resource is the maximum amount of band resources that can be allocated to the service server 300.

According to this, the blacklist module 212 examines whether or not the protocol, the protocol identification number (ID), the source IP address, the destination IP address, the source port number, the destination port number or the like is registered in the blocking list 212a and classifies an abnormal transmission packet according to a result of the examination.

Then, the resource management module 213 deletes information on the first communication resource or the second communication resource allocated for the abnormal transmission packet from the resource management table 213a.

For example, as the blacklist module 212 transfers an IP address contained in the abnormal transmission packet, the resource management module 213 examines whether or not the transferred IP address is registered in the resource management table 213a, and according to a result of the examination, the resource management module 213 deletes information on the communication resource allocated for the abnormal transmission packet, among the first communication resource and the second communication resource, from the resource management table 213a.

The disclosed embodiment is applied based on 5-tuple information containing a protocol, a source IP address, a destination IP address, a source port number and a destination port number.

When a transmission packet of an upload traffic transmitted from the mobile communication network to the Internet is a normal transmission packet that is not infected, the packet output module 214 transmits the normal transmission packet to the Internet. When a transmission packet of a download traffic transmitted from the Internet to the mobile communication network is a normal transmission packet that is not infected, the packet output module 214 transmits the normal transmission packet to the GGSN 110 of the mobile communication network. However, when the transmission packet of the upload or download traffic is an abnormal transmission packet, the packet output module 214 blocks transmission of the corresponding abnormal transmission packet.

Referring to FIG. 3, the communication resource management unit 220 includes a download QoS module 221 and an upload anti-DDOS module 222.

The communication resource management unit 220 examines a request for allocation of a new communication resource (e.g., a session resource or a band resource) based on the information registered in the aforementioned resource management table 213a.

When a session is requested to be established for the download traffic from the Internet to the mobile communication network, the download QoS module 221 determines whether or not to establish a new session referring to the resource management table 213a provided in the resource management module 213.

When allocation of the new communication resource exceeds the threshold value of the second communication resource of the service server 300 based on the second communication resource of the service server 300 defined in the resource management table 213a, the download QoS module 221 registers identification information of the service server 300 in the blocking list 212a as a blocking target.

For example, when a request for establishing a new session exceeds the session threshold value of the service server 300 based on the session resource of the service server 300 defined in the resource management table 213a, the download QoS module 221 registers the identification information of the service server 300 in the blocking list 212a in order to preferentially block the request for the new session and temporarily block additional traffics for the service server 300 for a predetermined period of time. At this point, the identification information is registered in the part having a temporary preservative characteristic of the blocking list 212a. As another example, the identification information may be registered in the part having a permanent preservative characteristic of the blocking list 212a in order to permanently block additional traffics for the service server 300.

When a request for allocating a new communication resource exceeds the threshold value of the first communication resource of the mobile terminal 100 based on the first communication resource of the mobile terminal 100 defined in the resource management table 213a, the upload anti-DDOS module 222 registers the identification information of the mobile terminal 100 in the blocking list 212a as a blocking target. At the same time, the upload anti-DDOS module 222 transfers the identification information of the mobile terminal 100 to the terminal control unit 230 so that the mobile terminal 100 may be isolated from the mobile communication network.

For example, when a request for establishing a new session exceeds the session threshold value of the mobile terminal 100 based on the session resource of the of the mobile terminal 100 defined in the resource management table 213a, the identification information of the mobile terminal 100 is registered in the blocking list 212a in order to preferentially block the request for the new session, and additional traffics for the mobile terminal 100 are temporarily blocked for a predetermined period of time. At this point, the identification information is registered in the part having a temporary preservative characteristic of the blocking list 212a. As another example, the identification information may be registered in the part having a permanent preservative characteristic of the blocking list 212a in order to permanently block additional traffics for the mobile terminal 100.

As described above, when allocation of a new communication resource is requested, the upload anti-DDOS module 222 determines whether or not to allocate the new communication resource referring to the resource management table 213a.

Referring to FIG. 4, the terminal control unit 230 includes a mobile terminal information update module 231 and an infected terminal control request module 232, and the mobile terminal information update module 231 includes a mobile terminal mapping table 231a.

The terminal control unit 230 provides the mobile communication network with a terminal identification number of the mobile terminal 100 in association with the packet processing unit 210 and the communication resource management unit 220 so that the mobile terminal 100 may be isolated from the mobile communication network. The terminal identification number may include a unique identification number uniquely allocated to the mobile terminal 100 and a temporarily identification number temporarily allocated for the traffics of the mobile terminal 100. Here, the unique identification number may be a mobile identification number, an equipment serial number or the like, and the temporarily identification number may be an International Mobile Station Identity (IMSI) or the like.

The mobile terminal information update module 231 includes the mobile terminal mapping table 231a in which the terminal identification number corresponding to the identification information or the IP address of the mobile terminal 100 is registered.

The mobile terminal information update module 231 newly registers the terminal identification number of the mobile terminal 100 in the mobile terminal mapping table 231a or updates a registered terminal identification number of the mobile terminal 100 with a latest value using an authentication packet provided by the authenticated packet separation module 211 of the packet processing unit 210. Accordingly, the mobile terminal mapping table 231a maintains a latest terminal identification number of the mobile terminal 100.

For example, the packet processing unit 210 may exchange authentication account information with the mobile communication network authentication server 130 when a service is started or stopped for the mobile terminal 100. Accordingly, the mobile terminal information update module 231 maintains a latest value of the operation identification information of the mobile terminal 100 in a method of adding or deleting the terminal identification number of the mobile terminal 100 using the authentication packet separated by the authentication packet separation module 211 of the packet processing module 210. Here, the authentication account information is the authentication packet provided by the authentication packet separation module 211 of the packet processing module 210 as described above.

As the transmission packet is classified as an abnormal transmission packet by the blacklist module 212, the infected terminal control request module 232 receives identification information, i.e., a source IP address or a destination IP address, of the abnormal transmission packet from the blacklist module 212, reads the latest value of the mobile terminal 100 corresponding to the identification information (i.e., the latest terminal identification number) from the mobile terminal mapping table 231a, and transmits the read latest value to the mobile communication network in order to release the radio resource of the mobile communication network allocated to the mobile terminal 100.

In addition, when in the upload anti-DDOS module 222, a request for allocating a new communication resource exceeds the threshold value of the first communication resource of the mobile terminal 100 based on the first communication resource of the mobile terminal 100 defined in the resource management table 213a, the infected terminal control request module 232 receives identification information of the mobile terminal 100 from the upload anti-DDOS module 222, reads the latest value of the mobile terminal 100 corresponding to the identification information (i.e., the latest terminal identification number) from the mobile terminal mapping table 231a, and transmits the read latest value to the mobile communication network in order to release the radio resource of the mobile communication network allocated to the mobile terminal 100 or not to additionally allocate a radio resource.

The infected terminal control request module 232 provides the EIR 120, which is a control device of the mobile communication network, with the latest value read from the mobile terminal mapping table 231*a*.

The EIR 120 of the mobile communication network is a control device for allocating or releasing a radio resource for the mobile terminal 100 in the mobile communication network, and the EIR 120 updates a mobile terminal status information (IMEI-Status) as an isolation target using the latest terminal identification number (e.g., IMSI) of the mobile terminal 100 received from the infected terminal control request module 232. In addition, the EIR 120 releases a radio resource occupied by the mobile terminal 100, which is an isolation target, in association with a Home Location Register (HLR). In addition, the EIR 120 controls to register the identification information of the mobile terminal 100 in the blacklist so that the mobile terminal 100 may not be re-authenticated.

According to the disclosed embodiment, whether or not a transmission packet of an upload or download traffic is abnormal is examined in a packet exchange section between a mobile communication network which provides a service to a mobile terminal and another communication network associated with the mobile communication network, and according to a result of the examination, it is supported to block transmission of the corresponding transmission packet and isolate an infected mobile terminal, and thus the infected mobile terminal may be effectively isolated from the mobile communication network.

In addition, since establishment of a new session or allocation of a new band is managed based on a defined communication resource, increase of a new session or increase of a new band, which abruptly increases network load, is effectively prevented while minimizing the effect on a service that is currently provided. Accordingly, it is effective in that stability of the overall communication network is maintained.

While the disclosed embodiment has been described with reference to particular illustrative embodiments, it is not to be restricted by the embodiments but only by the appended claims. It is to be appreciated that those skilled in the art can change or modify the embodiments without departing from the scope and spirit of the disclosed embodiment.

Therefore, the embodiment of the disclosed embodiment described above should be construed from an illustrative viewpoint, not a restrictive viewpoint, and the scope of the disclosed embodiment is specified in the claims, not in the detailed description, and thus it should be interpreted such that all the differences within the equivalent scope are included in the disclosed embodiment.

What is claimed is:

1. An apparatus for detecting and controlling an infected mobile terminal, the apparatus comprising:
   a packet processing unit for separating packets of an upload traffic or a download traffic into an authentication packet and a transmission packet in a packet exchange section between a mobile communication network which provides a communication service to a mobile terminal and another communication network which provides a communication service to a service server;
   wherein the packet processing unit includes:
      a blacklist module having a blocking list in which a plurality of pieces of identification information corresponding to tuple information is registered as blocking targets; and
      a resource management module having a resource management table for registering information on a first communication resource for the mobile terminal, an amount of the first communication resource currently allocated to the mobile terminal and a threshold value of the first communication resource set for the mobile terminal in correspondence to tuple information of the mobile terminal, and registering information on a second communication resource for the service server, an amount of the second communication resource currently allocated to the service server and a threshold value of the second communication resource set for the service server in correspondence to tuple information of the service server;
   a terminal control unit for updating a terminal identification number of the mobile terminal with a latest value using the authentication packet and, when the transmission packet is an abnormal transmission packet, requesting release of a radio resource allocated to the mobile terminal by transmitting a terminal identification number corresponding to the latest value to the mobile communication network; and
   a communication resource management unit for examining a request for allocation of a new communication resource based on the resource management table.

2. The apparatus according to claim 1, wherein the packet processing unit includes a packet output module for transmitting a corresponding normal transmission packet to another communication network when the transmission packet of the download traffic is a normal transmission packet, and blocking transmission of a corresponding abnormal transmission packet when the transmission packet of the upload or download traffic is an abnormal transmission packet.

3. The apparatus according to claim 1, wherein the tuple information includes a protocol, a protocol identification number, a source IP address, a destination IP address, a source port number and a destination port number.

4. The apparatus according to claim 1, wherein as an IP address contained in the transmission packet is searched for from the blocking list, the blacklist module classifies the transmission packet as the abnormal transmission packet.

5. The apparatus according to claim 1, wherein the blacklist module performs a deep packet inspection (DPI) process based on information on contents of the transmission packets transmitted i:. the packet exchange section and registers identification information of the blocking target in the blocking list based on a result of the deep packet inspection process.

6. The apparatus according to claim 1, wherein the resource management module deletes information on a communication resource allocated for the abnormal transmission packet, among the first communication resource and the second communication resource, from the resource management table using an IP address contained in the abnormal transmission packet.

7. The apparatus according to claim 1, wherein when a request for allocating the new communication resource exceeds the threshold value of the first communication resource, the communication resource management unit transfers identification information of the mobile terminal to the terminal control unit and, at a same time, registers the identification information of the mobile terminal in the blocking list as a blocking target.

8. The apparatus according to claim 1, wherein when a request for allocating the new communication resource exceeds the threshold value of the second communication resource, the resource management unit registers identification information of the service server in the blocking list as a blocking target.

9. The apparatus according to claim 1, wherein the amount of the first communication resource is a number of sessions currently allocated to the mobile terminal, the threshold value of the first communication resource is a maximum number of sessions that can be allocated to the mobile terminal, the amount of the second communication resource is a number of sessions currently allocated to the service server, and the threshold value of the second communication resource is a maximum number of sessions that can be allocated to the service server.

10. The apparatus according to claim 1, wherein the amount of the first communication resource is an amount of band resources that can be allocated to the mobile terminal, the threshold value of the first communication resource is a maximum amount of band resources that can be allocated to the mobile terminal, the amount of the second communication resource is an amount of band resources that can be allocated to the service server, and the threshold value of the second communication resource is a maximum amount of band resources that can be allocated to the service server.

11. The apparatus according to claim 1, wherein the packet processing unit transfers an IP address contained in the abnormal transmission packet to the terminal control unit.

12. The apparatus according to claim 1, wherein the terminal control unit includes a mobile terminal mapping table in which the terminal identification number corresponding to identification information of the mobile terminal is registered and updates the terminal identification number registered in the mobile terminal mapping table with the latest value using the authentication packet.

13. The apparatus according to claim 1, wherein the terminal control unit transmits the latest value to an equipment identity register (EIR) which controls allocation or release of the radio resource for the mobile terminal.

14. The apparatus according to claim 1, wherein the user identification number is an International Mobile Station Identity (IMSI).

15. A method for detecting and controlling an infected mobile terminal comprising:

separating, by a packet processing unit, packets of an upload traffic or a download traffic into an authentication packet and a transmission packet in a packet exchange section between a mobile communication network which provides a communication service to a mobile terminal and another communication network which provides a communication service to a service server;

wherein the packet processing unit includes:
   a blacklist module having a blocking list in which a plurality of pieces of identification information corresponding to tuple information is registered as blocking targets; and
   a resource management module having a resource management table for registering information on a first communication resource for the mobile terminal, an amount of the first communication resource currently allocated to the mobile terminal and a threshold value of the first communication resource set for the mobile terminal in correspondence to tuple information of the mobile terminal, and registering information on a second communication resource for the service server, an amount of the second communication resource currently allocated to the service server and a threshold value of the second communication resource set for the service server in correspondence to tuple information of the service server;

updating, by a terminal control unit, a terminal identification number of the mobile terminal with a latest value using the authentication packet and, when the transmission packet is an abnormal transmission packet, requesting release of a radio resource allocated to the mobile terminal by transmitting a terminal identification number corresponding to the latest value to the mobile communication network; and examining, by a communication resource management unit, a request for allocation of a new communication resource based on the resource management table.

\* \* \* \* \*